(12) United States Patent
Hughes

(10) Patent No.: US 10,495,346 B2
(45) Date of Patent: Dec. 3, 2019

(54) WIFI AND CLOUD ENABLED TEMPERATURE CONTROL SYSTEM

(71) Applicant: Branden Lamar Hughes, Atlanta, GA (US)

(72) Inventor: Branden Lamar Hughes, Atlanta, GA (US)

(73) Assignee: Avralis LLC, Atlanta, GA (US)

( * ) Notice: Subject to any disclaimer, the term of this patent is extended or adjusted under 35 U.S.C. 154(b) by 0 days.

(21) Appl. No.: 15/704,362

(22) Filed: Nov. 13, 2017

(65) Prior Publication Data

US 2019/0145660 A1    May 16, 2019

(51) Int. Cl.
 *G05D 23/00* (2006.01)
 *F24H 9/20* (2006.01)
 *G05D 23/19* (2006.01)

(52) U.S. Cl.
 CPC ....... *F24H 9/2007* (2013.01); *G05D 23/1919* (2013.01)

(58) Field of Classification Search
 CPC .................. F24H 9/2007; G05D 23/1919
 USPC ............................................. 700/300
 See application file for complete search history.

(56) References Cited

U.S. PATENT DOCUMENTS

| | | | |
|---|---|---|---|
| 8,550,369 B2 * | 10/2013 | Subramanian | F24H 9/2007 219/490 |
| 9,390,381 B2 * | 7/2016 | Davari | H04L 67/025 |
| 2005/0268865 A1 * | 12/2005 | Valbh | F24H 9/2007 122/14.1 |
| 2014/0156087 A1 * | 6/2014 | Amundson | G05B 15/02 700/278 |
| 2016/0187004 A1 * | 6/2016 | Wheelwright | F24D 19/1063 236/51 |

* cited by examiner

*Primary Examiner* — Md Azad
(74) *Attorney, Agent, or Firm* — Bekiares Eliezer LLP

(57) ABSTRACT

A method for electronic, remote control of an existing heating element. A temperature probe is monitored programmatically. That data is managed via wifi connectivity. A user can then control the operation of the device (water heater or other) at any time and from any location.

1 Claim, 5 Drawing Sheets

WIFI AND CLOUD ENABLED TEMPERATURE CONTROL SYSTEM

BACKGROUND TECHNOLOGY

Typical storage water heaters maintain a water temperature at a fixed setting throughout the day. Most homeowners, building or business owners, or other people in the general public can be unaware that the setting of the storage water heater can be changed or can be discouraged from trying to manipulate the setting without the aid of a professional due to various characteristics of the storage water heater such as where they are typically located within a building, the structure of the storage water heater itself, and the amount of energy that the water heater consumes. As such, water heaters typically run at the same, unchanged setting, which is one reason why storage water heaters have a high energy consumption and are one of the most costly appliances for a homeowner to run.

BRIEF DESCRIPTION OF THE DRAWINGS

The features and components of the following figures are illustrated to emphasize the general principles of the present disclosure. The corresponding features and components throughout the figures can be designated by matching reference characters for the sake of consistency and clarity.

DETAILED DESCRIPTION

Figure 1A:
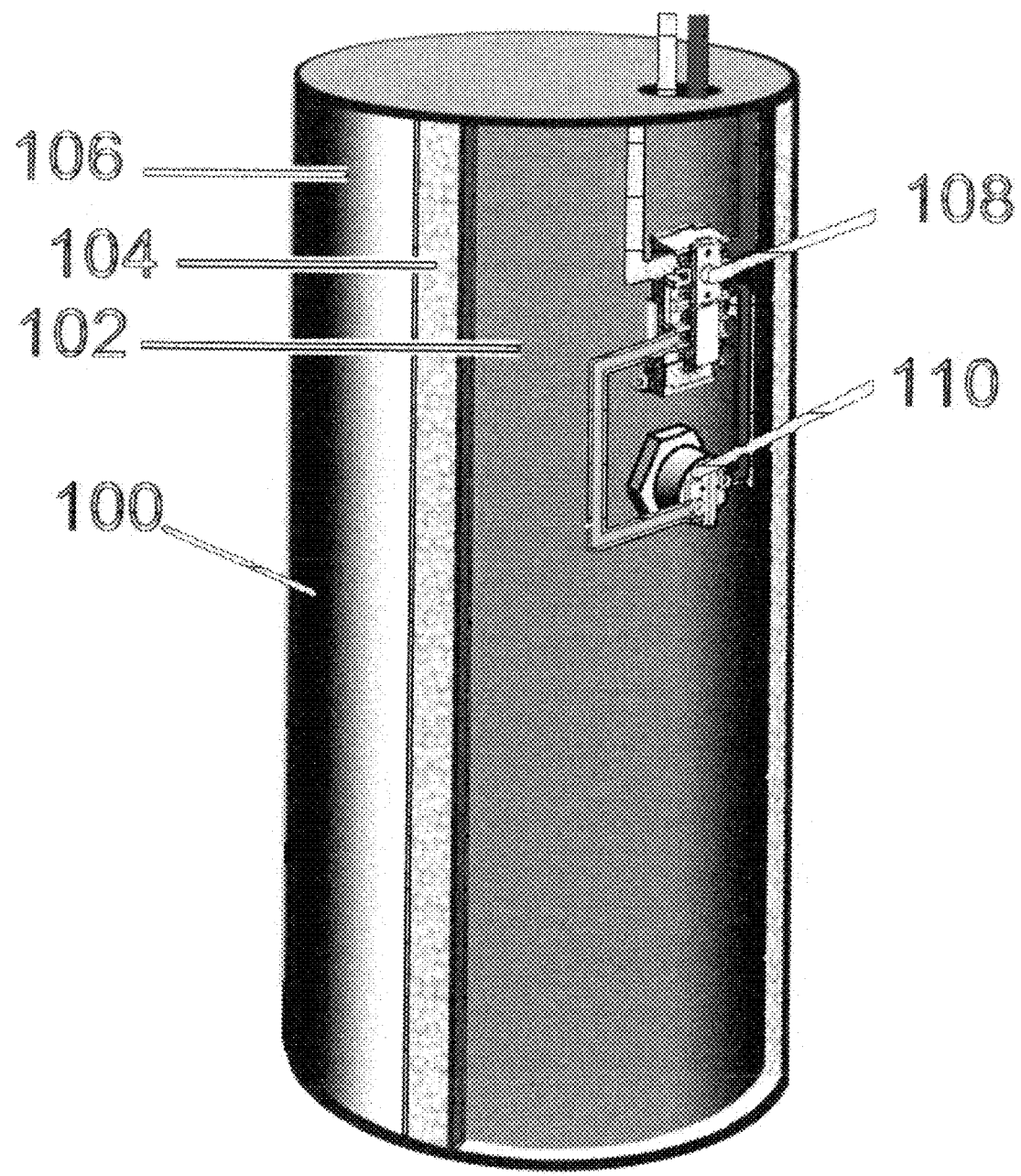
FIG. 1A shows a water heater system including a water tank and a temperature control system in accordance with aspects of the current disclosure.

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a band" can include two or more such bands unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance can or can not occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "can," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular embodiment. Directional references such as "up," "down," "top," "left," "right," "front," "back," and "corners," among others are intended to refer to the orientation as illustrated and described in the figure (or figures) to which the components and directions are referencing.

Most North American water heaters have traditionally been tank type water heaters, which are also known as storage water heaters. Storage water heaters typically come in sizes from about 20 to 100 gallons and can be designated for commercial or residential use.

FIG. 1A shows an example of a standard storage water heater 100. As shown in FIG. 1A, the storage water heater 100 generally includes a steel tank 102, which is configured to hold water to be heated, a metal shell 106, and foam insulation 104 between the steel tank 102 and the metal shell 106. The standard storage water heater 100 generally includes at least one thermostat 108 and at least one heat source 110. The heat source 110 can be electric heating elements, oil, propane, natural gas, oil, solar, or various other heating sources for heating water. The storage water heater 100 is configured to continuously keep water hot and ready for use.

Figure 1B:
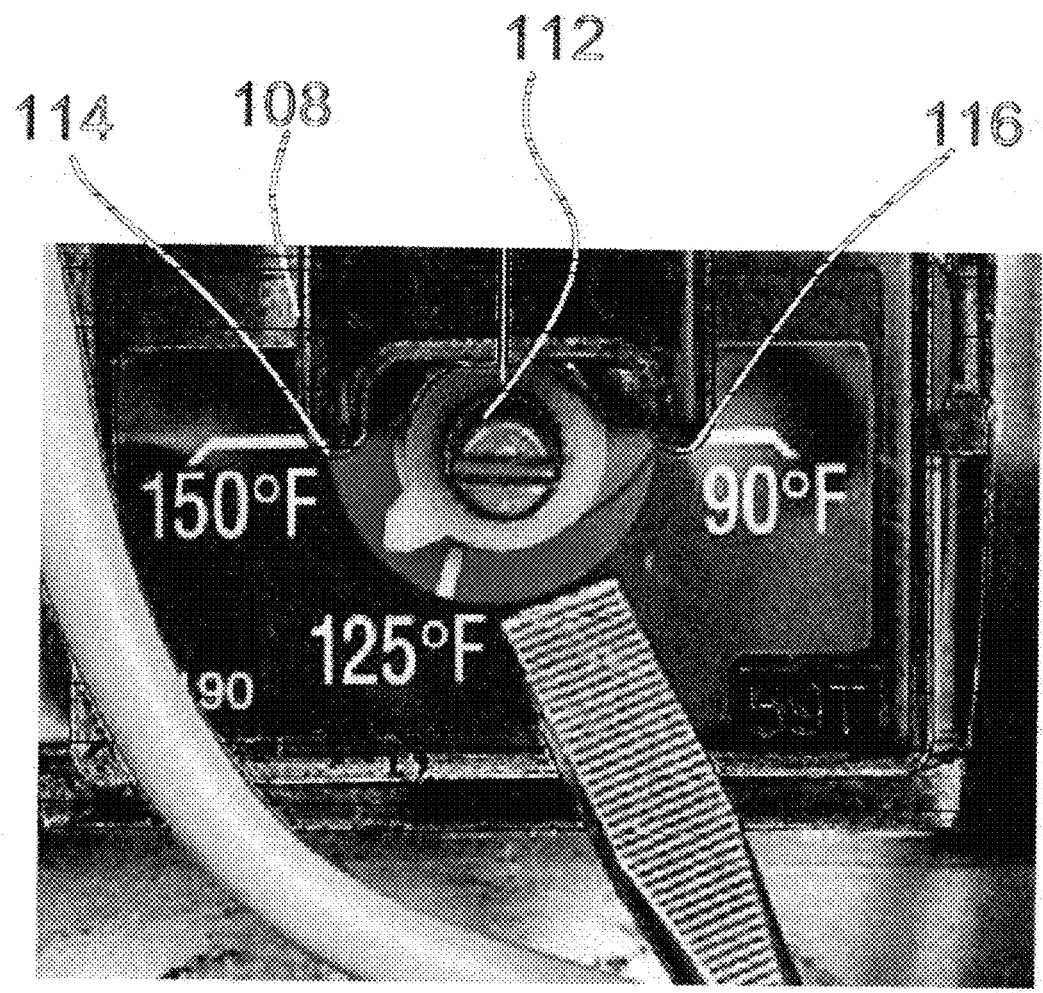
FIG. 1B shows a detail version of the temperature control system of FIG. 1A.

FIG. 1B shows a detailed view of a portion of the thermostat 108. As shown in FIG. 1B, the standard thermostat 108 generally includes a thermostat setting 112, which is used to set a temperature at which the water in the storage water heater 100 will be heated. The thermostat setting 112 may be moved between a predefined maximum temperature setting 114 and minimum temperature setting 116. The maximum temperature setting 114 and minimum temperature setting 116 are predefined by the manufacturer of the storage water heater 100 and cannot be changed by a user changing the thermostat setting 112. The thermostat 108 in a residential setting typically has a maximum temperature setting 114 of 150° F. and a minimum temperature setting 116 of 90° F., with the thermostat setting 112 capable of being set to temperatures in between. The thermostat 108 in a commercial setting typically has a maximum temperature setting 114 of 180° F. and a minimum temperature setting 116 of 120° F., with the thermostat setting 112 capable of being set to temperatures in between. To set or adjust the temperature setting 112, the user must manually adjust the thermostat setting 112, which in turn adjusts the water temperature that the heat source 110 is powered-on to heat the water. The thermostat 108 acts as a relay, powering off the heat source 110 when the water temperature is above the temperature setting 112, and powering on the heat source 110 when the water temperature is below the temperature setting 112.

Because it takes a great deal of energy to heat water, and because the energy efficiency of storage water tanks can widely vary, the energy consumption of storage water heaters is high relative to other appliances. Moreover, adjusting the thermostat setting 112 typically involves removing a portion of the metal shell 106 (such as a protective cover) and removing a portion of the insulation 104 to access the thermostat 108 and then manually adjusting the thermostat setting 112, which is a task that many average users that have no knowledge of water heaters may not want to undertake. Although some manufacturers have developed some energy efficient models storage water heaters, these water heaters are generally not compatible with other models or manufacturers. Moreover, use of these typically requires a homeowner or building owner to remove the entire old storage water heater and install the new water heater, which can be a costly endeavor.

Figure 2:
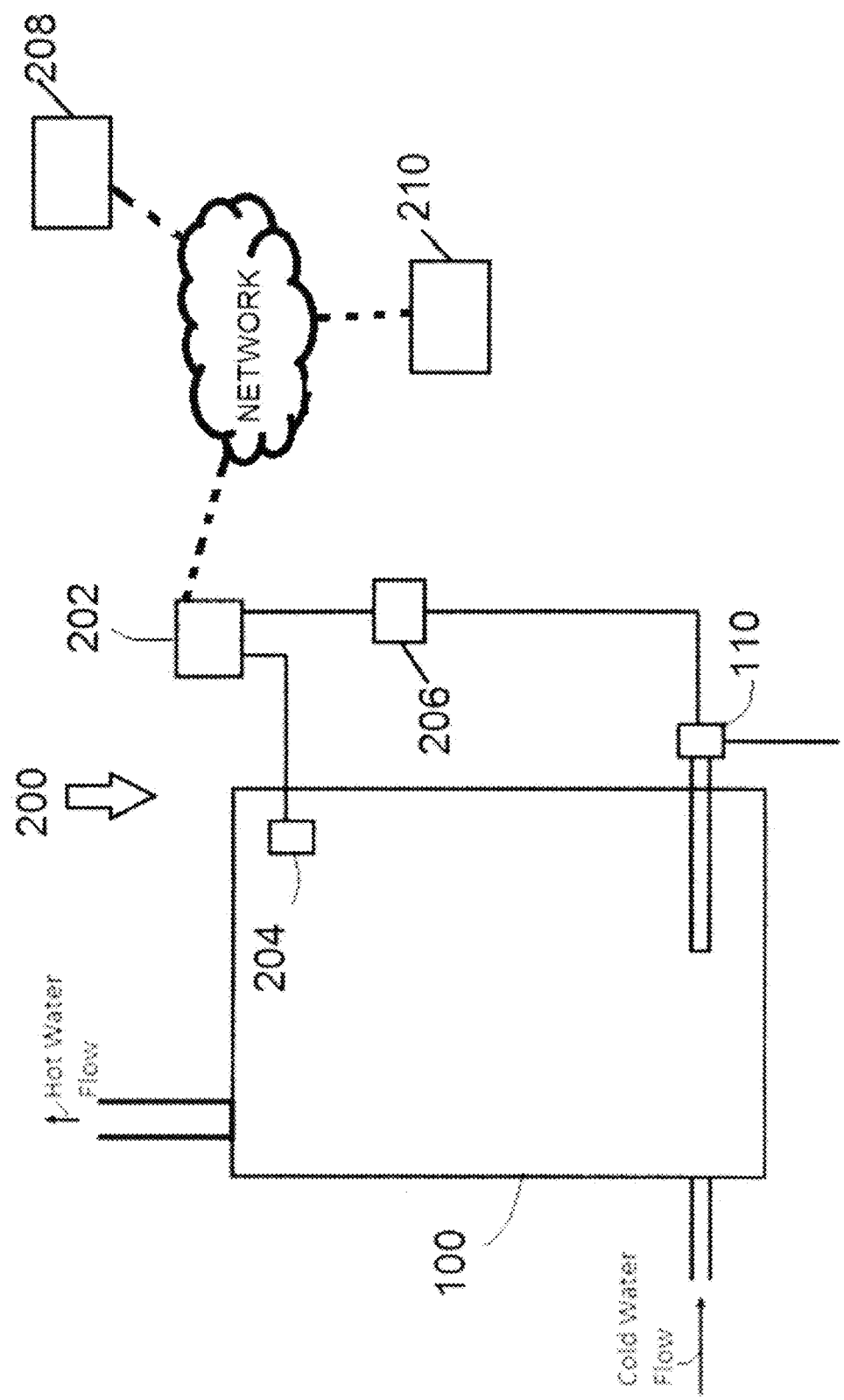
FIG. 2 is a schematic of the temperature control system of FIG. 1A.

Referring to FIG. 2, in view of the aforementioned problems, in one aspect, disclosed is a temperature control system 200 and associated methods, systems, devices, and various apparatus. The temperature control system 200 is configured for monitoring, controlling, and communicating a water temperature. In one aspect, the temperature control system 200 comprises a controller 202, a temperature probe 204, and a relay 206. It would be understood by one of ordinary skill in the art that the disclosed temperature control system 200 is described in but a few exemplary aspects among many. It is contemplated that the temperature control system 200 can be utilized with the storage water heater 100. However, one having skill in the art will appreciate that the temperature control system 200 can be utilized with various other systems where control of a temperature is desirable, including, but not limited to, incubators, home brewing systems, aquatic aquariums, terrestrial aquariums, and various other systems.

The controller 202 can be in communication with the temperature probe 204 and the relay 206. The controller 202 can also be in communication with a server 210 and a user device 208. The relay 206 can be in communication with the heat source 108, as described in greater detail below. Communications can occur through various communications networks known in the art, including but not limited to wired networks, wireless networks, Bluetooth networks, WiFi networks, RF networks, local area networks (LAN), internet networks, wide area networks (WAN), etc.

The temperature probe 204 is configured to measure the temperature of water within the water heater. The relay 206 is configured to selectively switch between an "on" status and an "off" status. In the on status, the relay 206 activates the heating source 110 such that the heating source 110 heats the water within the water heater 100. In the off status, the relay 206 deactivates the heating source 110 such that the heating source 110 does not heat the water within the water heater 100. As described in greater detail below, the status of the relay 206 is controlled by the controller 202.

The user device 208 can be utilized to receive information to control the water heater 100 from a user. For example and without limitation, the user device 208 can receive a water temperature minimum, a water temperature maximum, an instant on or off of the heating element 110, an away temperature minimum, an away temperature maximum, a sampling rate (rate at which the system 200 probes for data), etc. In other aspects, the user device 208 can display to the user the current water temperature, relay status, energy usage, energy usage cost, predicted energy cost, and various other information. In some aspects, the user device 208 can display real time information pertaining to the system 200 such as water temperature, relay status, energy usage, energy usage cost, etc. In other aspects, the user device 208 can display historical information pertaining to the system 200. The server 210 can be configured to store the various information received from the user device 208. In another aspect, the server 210 can be configured to store the water temperature as measured by the temperature probe 204 and the status of the relay 206 for a predetermined amount of time.

Figure 3:
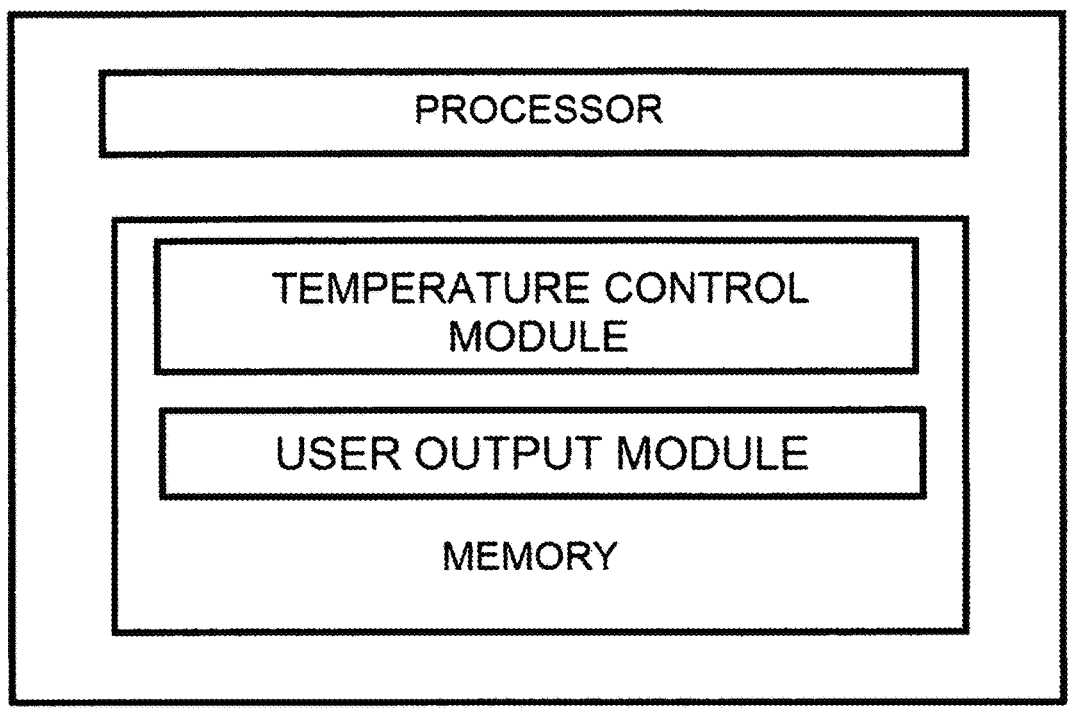
FIG. 3 is a schematic of the temperature control system of FIG. 1B.

Referring to FIG. 3, the controller 202 can comprise a processor and a memory. The processor is configured for sending and receiving data from the various components of the system 200. In some examples, the memory can hold a predetermined amount of data. For example, the memory can hold data for a predetermined amount of time (e.g. one day, one week, one month), can hold a predetermined number of readings (e.g. 10 temperature readings, 100 temperature readings, 1000 temperature readings), or other amounts of data. Additionally, the memory can hold instructions for the processor to execute. Referring to FIG. 3, in some aspects, the memory can comprise instructions for a temperature control module. The memory can also comprise instructions for a user output module.

Figure 4:
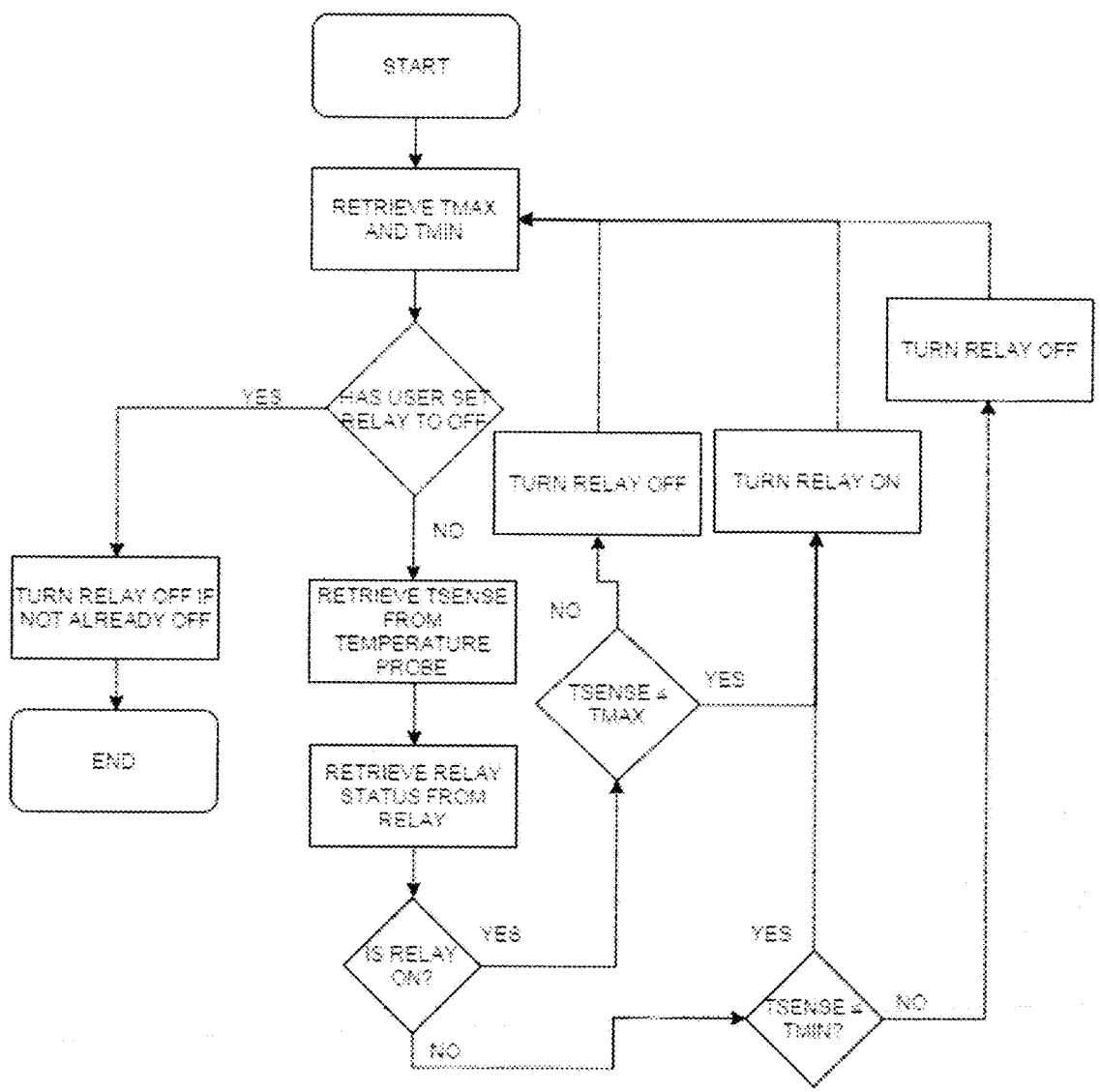
FIG. 4 is a flow chart of a method of controlling a temperature with the temperature control system of FIG. 3.

Referring to FIG. 4, an example method of controlling the water temperature of the water heater 100 via the temperature control module is disclosed. In one aspect, the method comprises receiving the water temperature maximum and the water temperature minimum from the user. In some aspects, controller 202 receives the water temperature maximum and minimum from the user device 208. In other aspects, the controller 202 receives the water temperature maximum and minimum from the server 210, which may store the water temperature maximum and minimum.

In some aspects, the controller receives the water temperature maximum and the water temperature minimum at predefined sampling rates. The predefined sampling rates can be preinstalled into the controller as a default setting or can be set by the user via the user device. For example and without limitation, in some aspects, the controller can sample at a rate of 1-10 s (high rate), 30-60 s (medium rate), 5-15 minutes (low rate), 4-24 hours (sleep rate where controller enters a low power state and only periodically "wakes up" to collect data).

The method further comprises determining whether the user has set the relay to off via the user device. If the user has set the relay to off, the controller sends a signal to the relay to turn the relay off if the relay is not already off, and the process ends.

If the user has not set the relay to an off status, the controller retrieves the sensed temperature of the water (TSENSE) from the temperature probe. In some aspects, TSENSE is retrieved at the sampling rate. In another aspect, the controller retrieves the relay status from the relay. As previously described, the relay can have two statuses—an "on" status where the relay enables the heating element to heat the water in the water heater, and an "off" status where the relay prevents the heating element from turning on to heat the water in the water heater.

In some aspects, the method comprises determining if the relay is at the "on" status. In some aspects, the controller can retrieve the relay status from the relay. In other aspects, the relay sends the relay status to the controller. If the relay status is on, the controller determines whether TSENSE is less than or equal to TMAX. If the controller determines that TSENSE is greater than TMAX, the controller sends a signal to turn the relay to be in the off configuration. In this aspect, after the controller turns the relay off, the controller retrieves the TMAX and TMIN from the user device and determines whether TMAX and TMIN have changed from the previous reading.

If the controller determines that TSENSE is less than or equal to TMAX, the controller sends a signal to the relay to turn the relay to "on". After turning the relay on, the controller retrieves the TMAX and TMIN from the user device and determines whether TMAX and TMIN have changed from the previous reading.

If the controller determines that the relay is not on, the controller determines whether TSENSE is less than or equal to TMIN. If TSENSE is less than or equal to TMIN, the controller turns the relay on such that the heating element can heat the water in the water heater, and then the controller retrieves the TMAX and TMIN from the user device and determines whether TMAX and TMIN have changed from the previous reading.

If TSENSE is greater than TMIN, the controller turns the relay off, and then retrieves the TMAX and TMIN from the user device and determines whether TMAX and TMIN have changed from the previous reading. The process continues until the controller determines that the user has turned the relay off, as described above.

Process Steps
  Retrieves user input from the cloud (server 210)
  Temperature setting to start heating
  Temperature setting to stop heating
  Instant off/on
  Away mode minimum setting to let temperature fall to
  Away mode maximum setting to let temperature heat to
  Sample rate (speed the device probes for data, and collects user data from the cloud): High (1-10 s), Medium (30-60 s), Low (5-15 minutes), deep sleep (extremely low power mode setting on chip, wakes up only every 4-24 hours for collection cycles)
  LED lights on or off (will usually sit inside of a closet, so 99% of the time lighting LEDs is a waste of power, albeit a very tiny one)
  Reads temperature probe at X frequency, where X is the sample rate
  Reads status of relay (on/off) at X frequency, where X is the sample rate
    Sets status of element/relay on
    if element/relay is off, and temperature probe data <temperature setting to start heating (or away mode min)
    Sets status of element/relay off
    if element/relay is on, and temperature probe data >temperature setting to stop heating (or away mode max)
  Updates data (temperature, relay status) back to user device 208
  Controls heating element as compared to user's threshold settings
    UI/app based configurable user settings
    kWh cost
    Element wattage
    For tracking real time energy usage (when combined with element/relay state)
    Stored in historical roll-up metrics to monitor and graph over time
Benefits
  Configurable range of heating
    Traditional water thermostats have a fixed setting
    Set temp to lower than 90 degrees, control temps above 180 degrees
    Standard temperature controls limited to 90-150 (residential) or 120-180 (commercial)
  Away mode
    Configurable with calendar/scheduler
    Configurable with geo-fencing (GPS range)
    Instant On/Off
  Sanitization mode
    Heat water to 150 or above for a specific period of time
    Clean tank after sitting unheated for extended period
    Provide an extra hot dishwasher/clothes washing cycle
  Child safety mode
    Set to 100 F or below for specific time periods
    See: https://www.pseg.com/home/education_safety/safety/scalding.jsp
  Prevent pipes from freezing, while still minimizing heating cost
    Away mode min, which can be set lower than 90 F, but not allow it below freezing
  Real time energy monitoring (cost, wattage, etc.)
    Track how much money spent/energy used or consumed over a time period
    Can be compared with the national average, as well as other users
  Possible use-cases
    Electric water heater
    Incubator
    Home brew or brewery system
    Aquatic aquariums
    Lighting/pumps/control system (temperature probe is waterproof)
    Terrestrial aquariums
    Heat lamps
    Any application where smart control of device based on temperature is desirable
  Learning mode/Smart scheduling
    By tracking data over time, we estimate how long it will take to for water heater temperature to go from a low to an ideal setting
    Using historic data, create a perfect schedule, only heating as needed for a user's lifestyle
    Using geo-fencing, can also heat to ideal temperature as user crosses geographical "fence" of proximity to the home
  User controlled schedule
    Setting specific time intervals to operate, based on user input of their schedule
  Password protection
    Can be locked for renters or guests
  Tamper prevention
    Removes mechanical connection, prevents adjustment from anyone who has access appliance Prior Art considerations Rheem's EcoNet http://www.rheem.com/EcoNet/Home "The first integrated system for your home's heating, cooling and water heating equipment—delivering a new level of efficiency, convenience and comfort."

Rheem's EcoNet is also designed for smart control of a hot water heater, via wifi, and presumably over the cloud (they have iOS and Android apps available). However, Rheem's design is proprietary and only works for their newest (and higher end) models of water heaters. It is not meant as a generic replacement of the existing thermostat on any prior model, or non-Rheem model of water heater. It also does not include any relays or microprocessor driven temperature probe control mechanisms.

Sunnovations Aquanta http://sunnovations.com/

"Introducing Aquanta, the first networked water heater controller that easily installs on your existing water heater and that lets you monitor and control hot water energy use from your smart device or home networking platform."

This was a kickstarter project that failed to get funded. No official release date is available at this time. This may or may not ever be produced and sold. In either case, it uses an entirely different mechanism td "control" the water heater. It only works in tanks holding 120 gallons or less. It also only works in tanks with a ¾" port. My solution has no such restrictions. The control mechanism for this solution is effectively cutting the hot water heater on and off. It is not a thermostat replacement, and it does not install inside of existing water heater thermostat compartments, but is instead meant to sit on top of the water heater. It appears to also require separate powering, and is not at all an integrated solution.

British Gas' Hive:

https://www.britishgas.co.uk/products-and-services/hive-active-heating.html

This is only meant for gas applications, not electric. It's also a UK-based, not US-based product. It also is not meant as an existing-thermostat replacement, but an entirely separate module, which requires a wireless thermostat, hub, and receiver.

Nest's 3rd generation domestic hot water control (or OpenTherm):

https://nest.com/uk/support/article/Learn-more-about-the-3rd-generation-Nest-Thermostat-s-domestic-hot-water-control This is meant for gas (boiler/pilot-light type) applications, not electric. It's also UK specific. Rather, the OpenTherm standard is UK specific. Taking UK-based OpenTherm out of the equation, the best Nest can do is turn the water heater on and off, not control the temperature. It also is not meant to replace the existing thermostat. It is not an adaptive/integrated solution, and not compatible with all US-based electric hot water heaters.

The invention claimed is:

1. A method comprising:

integrating a container of a fluid with a digital temperature control means, the digital temperature control means comprising:

a first means for reading a measurement captured by a temperature sensor configured to measure a temperature of the fluid in the container, a second means for operating a relay to determine and control a state of a heating source configured to affect the temperature of the fluid in the container, a communications module for bi-directionally communicating data with a remote network, a processor for processing data, and a controller configured to operate the processor, the first means, the second means, and the communications module;

retrieving a user input comprising at least one of the following:

a first temperature threshold, a second temperature threshold, a first sample rate for operating the first means to retrieve the measurement captured by the temperature sensor, and a second sample rate for operating the second means to determine and control a state of the heating source;

receiving, via the first means, the measurement captured by the temperature sensor in accordance to the first sample rate;

determining, via the second means, the state of the heating source;

controlling, via the second means, the state of the heating source, wherein controlling the state of the heating source comprises:

turning the heating source on when the heating source is off and the measurement is below the first temperature threshold, and turning the heating source off when the heating source is on and the measurement is above the second temperature threshold;

aggregating data associated with the container of the fluid and operation of the digital temperature control means;

calculating usage analytics, the usage analytics comprising:

power consumption associated with the container of the fluid, the energy usage comprising real-time usage data and historical usage data, and costs associated with the power consumption;

predicting future power consumption and costs associated with the container of the fluid, wherein predicting the future power consumption and costs comprises:

employing the usage analytics, and employing at least one environmental factor based on:

a location of the container of the fluid, and times of operation of the heating source; and adjusting, based on predicted future power consumption and costs, the first temperature threshold and the second temperature threshold, wherein integrating the container of the fluid with the digital temperature control means comprises integrating the container of the fluid that has no built-in cloud-enabled communications module for communicating with WiFi network.

* * * * *